(12) United States Patent
Lazarev et al.

(10) Patent No.: US 6,913,783 B2
(45) Date of Patent: Jul. 5, 2005

(54) METHOD OF OBTAINING ANISOTROPIC CRYSTALLINE FILMS AND DEVICES FOR IMPLEMENTATION OF THE METHOD

(75) Inventors: Pavel I. Lazarev, Belmont, CA (US); Victor V. Nazarov, Odintsovo (RU); Natalya A. Ovchinnikova, Mendeleevo (RU)

(73) Assignee: Optiva, Inc., So. San Francisco, CA (US)

( * ) Notice: Subject to any disclaimer, the term of this patent is extended or adjusted under 35 U.S.C. 154(b) by 247 days.

(21) Appl. No.: 10/239,944

(22) PCT Filed: Feb. 6, 2002

(86) PCT No.: PCT/US02/03800

§ 371 (c)(1),
(2), (4) Date: Apr. 14, 2003

(87) PCT Pub. No.: WO02/063660

PCT Pub. Date: Aug. 15, 2002

(65) Prior Publication Data

US 2003/0154909 A1 Aug. 21, 2003

(30) Foreign Application Priority Data

Feb. 7, 2001 (RU) ......................................... 2001103245
Mar. 14, 2001 (RU) ......................................... 2001106515
Apr. 16, 2001 (RU) ......................................... 2001109980

(51) Int. Cl.$^7$ ............................. B05D 5/06; B05C 11/00
(52) U.S. Cl. ........................................ 427/162; 118/600
(58) Field of Search .................... 438/29–30; 427/162, 427/163.1, 163.2, 372.2, 375; 118/58–60, 64–65, 600

(56) References Cited

U.S. PATENT DOCUMENTS

| | | | |
|---|---|---|---|
| 2,320,702 A | 6/1943 | Marchese et al. | |
| 4,143,187 A | 3/1979 | Pilgrim et al. | |
| 4,702,558 A | 10/1987 | Coles et al. | |
| 4,810,433 A | 3/1989 | Takayanagi et al. | |
| 5,073,219 A | 12/1991 | McArdle et al. | |

*Primary Examiner*—Evan Pert
(74) *Attorney, Agent, or Firm*—Dorsey & Whitney LLP

(57) ABSTRACT

The invention pertains to methods of obtaining anisotropic crystalline films and to devices for carrying out the methods. A colloidal system with anisometric particles is applied as a film onto the surface of a substrate while the viscosity of the colloidal system is lowered. The particles of the colloidal system with lowered viscosity are oriented and the original viscosity of the colloidal system is restored. The film is then dried. The drying is carried out under controlled conditions. Zones of the dried film may be progressively heated to improve the film characteristics.

34 Claims, 3 Drawing Sheets

METHOD OF OBTAINING ANISOTROPIC CRYSTALLINE FILMS AND DEVICES FOR IMPLEMENTATION OF THE METHOD

This application is a 371 of PCT/US02/03800 filed Feb. 6, 2002.

FIELD OF THE INVENTION

This invention relates to a method and device for forming anisotropic films on a substrate, and more particularly to methods and devices for forming crystalline films from liquid crystal material for liquid crystal displays.

BACKGROUND ART

There are various known methods and devices for forming crystalline films from various materials. For example, to obtain films of polycrystalline silicon one uses a known process of precipitation from a gas mixture of silane at low pressure. The process is labor-intensive and requires expensive equipment to form isotropic polycrystalline films.

There are also various known methods of epitaxial growth of monocrystalline films, which include gas epitaxy, molecular-beam epitaxy and liquid epitaxy. These processes are technologically labor-intensive and power consuming, requiring expensive equipment; moreover, there are a number of materials for which obtaining anisotropic crystalline films is an unsolved problem.

There are known methods of obtaining anisotropic films from liquid-crystalline (LC) solutions of organic dyes. The methods involve application of liquid-crystalline dye solution onto a substrate, application of external orienting action and drying, which provides films with optical anisotropy.

There is an increasing requirement to improve the parameters of various thin film devices and, accordingly, the characteristics and quality of films used in them. Thus, there is an increase in requirements to the degree of anisotropy and uniformity of characteristics in films functioning as polarizing coatings, orienting, phase-shifting, reflecting, brightening and other optical elements as well as anisotropic films for other purposes. It is necessary to create device elements based on anisotropic films with an increased degree of anisotropy, with a more perfect structure, and which do not contain admixtures or structural defects.

SUMMARY OF THE INVENTION

It is a general object of the present invention to provide: 1) an improved crystallization method which allows obtaining anisotropic crystalline films from colloidal systems (colloid solutions) of various matters, 2) a device for implementation of this method, and 3) thin crystalline films obtained with the method and/or device.

The technical result of the invention is the design of the new method of crystallization to create anisotropic crystalline films from colloidal systems of various matters, formed by the anisometric elements of the dispersion phase (kinetic units) distributed in liquid dispersion medium; simplicity and economy of the method, ensuring high degree of anisotropy and crystallinity of the obtained films, possibility to form crystalline films of arbitrary shape (including curvilinear), ecological cleanness of the process, low labor-intensity and power consumption. Devices for obtaining anisotropic crystalline films are characterized by the simplicity of implementation, ecological cleanness, they ensure obtaining films with high degree of anisotropy and good reproducibility of characteristics.

DESCRIPTION OF PREFERRED EMBODIMENTS

The technical result of the first embodiment is achieved by the following steps: a) application of a layer of the colloidal system with anisometric particles (elements of the dispersion phase) onto the substrate, b) external action on the colloidal system to lower its viscosity, c) external orienting action on the system to provide dominating orientation of particles of the colloidal system, d) cessation of the external orienting action or application of additional external action to restore at least the initial viscosity value of the colloidal system, and e) drying under controlled conditions.

External action on the system to lower its viscosity and external orienting action on the system to provide dominating orientation of particles in the colloidal system can be applied simultaneously with lowering the viscosity or the external orienting action on the system can be applied after the process of lowering the viscosity. The external action on the system can be implemented via local and/or general heating of the substrate from the side opposite to that on which the film is formed, and/or local and/or general heating of the substrate and/or layer from the side of the forming film. Moreover, the heating can be implemented with electromagnetic (IR, Microwave, etc.) radiation, and/or using resistive heater, and/or alternating electrical or magnetic field, and/or a flow of heated liquid and/or gas.

External action on the system can also be implemented via mechanical action on the layer of the colloidal system applied on the substrate, for example via shearing. Upon the surface of the applied layer of colloidal system one directs at least one orienting tool, in the capacity of which one can use orienting knife-like and/or cylindrical rod, and/or flat plate positioned parallel to the applied layer, and/or at an angle to the surface of the applied layer, at the same time, the distance from the surface of the substrate to the edge or the plane of the orienting tool is set in order to obtain the desired film thickness. The surface of the orienting tool can have a relief. Additionally, the orienting tool can be heated.

Restoration to at least the original value of viscosity of the system is performed by cession of external action on the system immediately after completion of external orienting action or in the process of external orienting action.

Drying is preferably performed at humidity no less than 50% and room temperature.

BRIEF DESCRIPTION OF THE DRAWINGS

The invention will be more clearly understood from the following description when read in conjunction with the accompanying drawings in which.

Figure 1:
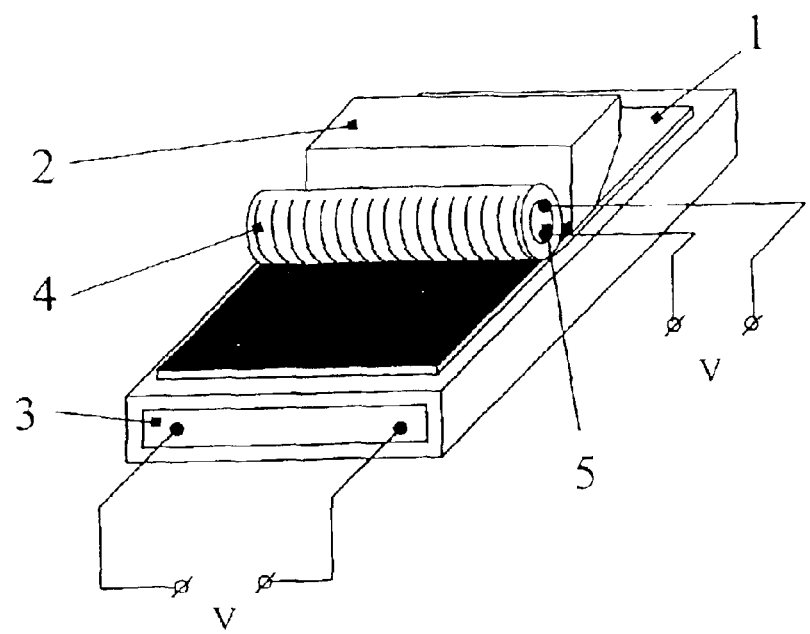
FIG. 1 is a perspective view schematically illustrating one embodiment of a device for carrying out the present invention.

A device for carrying out the method of the first embodiment is schematically illustrated in FIG. 1. The use of this device to fabricate a liquid crystal display is described using a 9.5% aqueous solution of sulfonated indanthrone, which forms a hexagonal phase at room temperature. The dye, utilized in this example, when in solution, forms anisometric supramolecular complexes from molecules of the dye. These complexes will be the main foundation of the crystalline structure of the film. The original ink after purification is deposited onto the substrate 1 using dosimeter 2. We have also used such methods of deposition as pouring, smearing. They all yield approximately the same results in this method.

Further, the colloidal system is impacted so as to lower its viscosity, which is necessary to perform the subsequent crystal alignment. The solution forms nematic phase or a mixture of nematic and hexagonal phases. Viscosity of the system is lowered from about 1780 mPa/sec to about 250 mPa/sec. Quality anisotropic crystalline films have been obtained when we implemented this preliminary impact to lower viscosity of the system. Optimal implementation of the said external impact is by heating of the deposited layer from the bottom side of the substrate holder, which is carried out via thermal elements 3. The substrate holder is heated so as to raise the temperature of the deposited indanthrone layer to about 56° C. However, good results may also be obtained when heating the deposited layer with electromagnetic radiation or using other methods. A special case of implementation of the disclosed invention is the use of heated rod 4 to implement local lowering of viscosity of the system with simultaneous alignment of the crystalline material. The rod may be heated by an additional thermal element 5.

The next operation is the process of alignment of the kinetic units of the colloidal system (LLC). To implement the said external aligning impact; one may use various aligning tools. In this example we have used a cylindrical Mayer rod wound with a wire, which determined the thickness of the wet layer—9.5 micrometers. When performing the aligning impact, the rate of translation of the rod was about 13 mm/sec. Shear stress generated by the rod resulted in additional lowering of viscosity of the system.

When alignment was completed, the heating of the substrate holder was stopped and the heated rod was removed. The film was then dried. Requirements for drying are such that the rate of removal of the solvent should be low in order to prevent disruptions of the previously aligned structure of the layer. In the above example, drying is performed at room temperature and humidity 60%. A device for providing controlled drying will be presently described.

By using this method we obtained anisotropic crystalline films with thickness of 0.3–0.4 micron, with high degree of anisotropy of parameters: dichroic ratio—Kd=28 with transmission T=40% (whereas with traditional method of fabrication Kd does not exceed 20), with good reproducibility of parameters, over the surface of the film, as well as from batch to batch. The crystalline structure of obtained films was evaluated by optical methods and methods of x-ray diffractometry.

A second embodiment of the invention is achieved by the following steps: a) external action on the colloidal system with anisometric particles, situated in a reservoir to lower its viscosity, b) external action on the system to provide dominant orientation of particles in the colloidal system via running it through a slot-die under pressure as the film is applied to the substrate, c) formation of film with heightened viscosity at the exit from the slot-die due to cessation of the external action or application of additional external action to provide restoration of at least the initial value of viscosity of the colloidal system, and d) drying.

External action on the system can be implemented via heating of the colloidal system situated in a reservoir. At the same time, the heating can be implemented with electromagnetic radiation, and/or resistive heater, and/or alternating electric or magnetic field, and/or a flow of heated fluid and/or gas. On the inner walls of a slot-die, external orienting action is implemented as the film is applied.

After application of layer of the colloidal system onto the substrate one can additionally implement orienting action on the system in the same direction as in the process of the main orienting action, created by the relief of the surface of the inner walls of the slot-die. In the process of forming crystalline film, the substrate can also be cooled to restore the original viscosity. Drying is preferably conducted at humidity levels of no less than 50% and room temperature.

The colloidal system can use LLC and use external action such as heating to obtain the phase transition in the system. The colloidal systems may contain crystalline anisotropic particles. Concentration of the dispersion phase in the colloidal system is chosen such as to provide thixotropy of the system. The kinetic units in the colloidal system can carry a charge.

After restoration of the initial value of viscosity of the colloidal system one can implement additional orienting action on the system in the same direction as in the process of the main orienting action.

Figure 2:
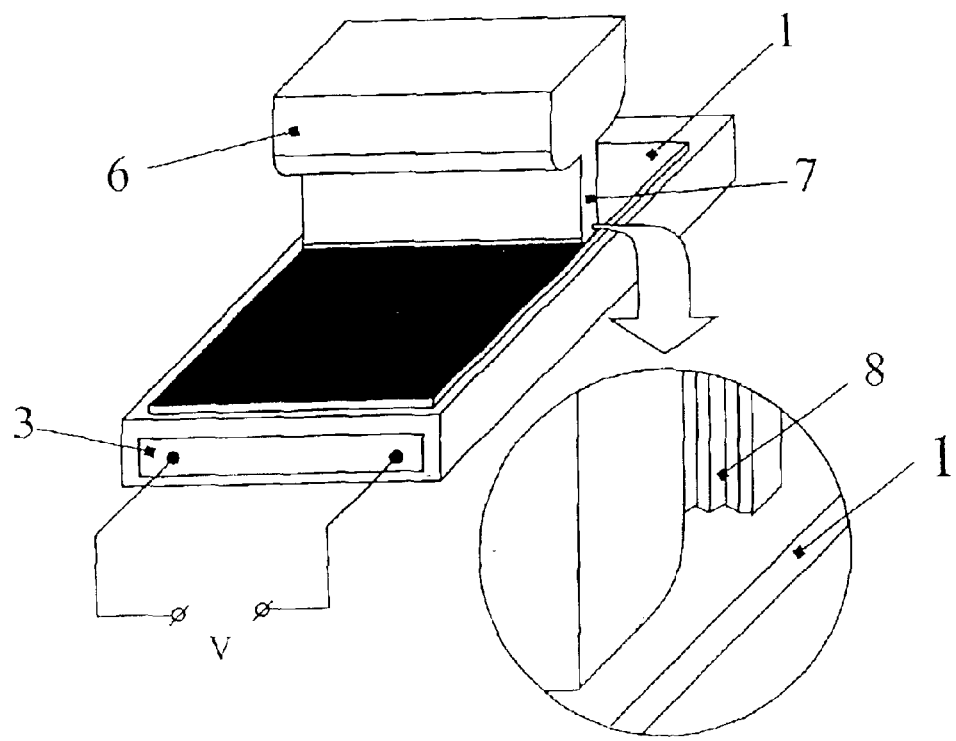
FIG. 2 is a perspective view schematically illustrating another embodiment of a device for carrying out the present invention.

A device for carrying out the method of the second embodiment using the same colloidal solution with the same concentration is schematically illustrated in FIG. 2 where like reference numerals have been applied to like parts. The solution was placed in the reservoir 6 and heated to about 56° C., which resulted in the phase transition and lowering of viscosity from the original 1780 mPa/sec to 250 mPa/sec. Alignment was performed via extrusion from the slot 7 under the pressure of 1 atm higher. The gap between the walls of the slot was 50 mm; on one of the inner walls of the slot we formed a relief 8 with step size of 100 mm and height 10 mm. Alignment of LLC was performed in the slot itself during extrusion of the colloidal system through the slot. In the process of extrusion, the slot is translated over the substrate in such a way that the extruded layer was uniformly deposited onto the substrate. Viscosity in the deposited layer increased up to about 1500 mPa/sec due to the phase transition (since heating was only provided in the reservoir, temperature outside of the reservoir was room temperature). Drying operation was performed as described with respect to the first embodiment. The resulting anisotropic crystalline films had parameters analogous to those obtained in the first embodiment.

We have established that the conditions of drying determine perfection and peculiarities of the structure in the dried films. Drying conditions largely determine the degree of their crystallinity. As our experiments have shown, certain arrangements of the drying process enhance thermal stability of the films. A gradient, created over the substrate, promotes optimized advancement of the crystallization front, which will largely determine dimensions of the crystalline structure of the obtained films, and also will allow eliminating structural defects, which result from the orienting influence.

Technical result of the invention is the enhancement of perfection of the film's structure, enhancement of reproducibility of film's parameters over the surface of the film as well as through its thickness (elimination of defects from orienting influence), enhancement of anisotropy of properties and enhancement of thermal stability of the films.

Crystallization of the forming film takes place during the drying process, simultaneously with solvent removal.

Therefore, by creating certain conditions for removing solvent fumes from the surface of the film one can regulate redistribution of solvent molecules inside the film, thus affecting crystallinity of its structure.

We have established that to perfect the film's structure, enhance degree of anisotropy and reproducibility of film's properties, it is necessary to provide conditions where removing the solvent happens slowly without (or with minimal) convection over the film's surface. Thus, arranged forced slowing of the drying rate, i.e. the quantity of solvent molecules leaving the film per unit of surface area per unit time, keeps solvent molecules in the film and slows the rate of their redistribution inside the films towards the surface. This slows the rate of crystallization and creates favorable conditions for aligning anisometric particles in the certain predetermined direction. Redistribution also takes place in the structure of the anisometric particles, which also favorably affects perfection of the crystalline structure of the forming film.

By the term finite volume in this case we mean the volume above the surface of the forming film, which is confined by a shell or a lid, where there are openings (slot, porous membrane, sliding panel of a shell and other), dimensions of which are such that the rate of deflecting the fumes is less than it would be if the process were performed in an infinite volume. By the term infinite volume we mean sufficiently large volume when an increase or a decrease of this volume over the surface of the forming film would not affect the rate of deflecting solvent fumes, i.e. the drying rate.

Therefore, the limiting stage of the drying process in the disclosed method is the rate and the direction of deflecting solvent fumes from the surface of the substrate. The process takes place according to diffusion kinetics, which creates more "calm" conditions for forming crystalline structure.

Since the process of removing the solvent is usually accompanied by significant change of geometric dimensions (thickness) and surface morphology of the film, by creating conditions to slow down the directional displacement of the solvent we thus create conditions for more gradual redistribution of solvent molecules in the film and more uniform and organized additional structuring of anisometric particles of the system (already after their external orientation) during drying process. This leads to lowering elastic stresses during crystallization process, which are due to geometrical deformation of the film. As a result, this enhances perfection of the film's structure and degree of its anisotropy.

By limiting the volume over the crystallizing film, we create conditions to increase solvent vapor pressure above the forming film, so that the effective solvent evaporation rate drops.

We use the term finite volume—when changing the volume affects the rate of removing molecules of an arbitrary material (in our case it is the solvent), i.e. the rate of drying. If the volume of a shell or a chamber, where the drying process takes place, will be sufficiently large, then changing it would not be noticeably reflected in the drying rate.

We have established experimentally that the mentioned technical result is achieved by the fact that in the process of forming crystalline anisotropic films from colloidal systems with anisometric particles, which includes application of the colloidal system onto the substrate and in situ and/or subsequent orienting influence and drying, the drying operation is performed at a temperature in the interval from 0° to 50° C. and humidity in the interval from 60 to 90% with forced drying rate slowing via performing the drying process in a finite volume, which is selected with the condition to restrict deflection of solvent fumes from the surface of the forming film.

Moreover, the finite volume over the surface of the forming film may be created by performing the drying process in a shell covering at least a part of the surface of the wet film.

Figure 3:
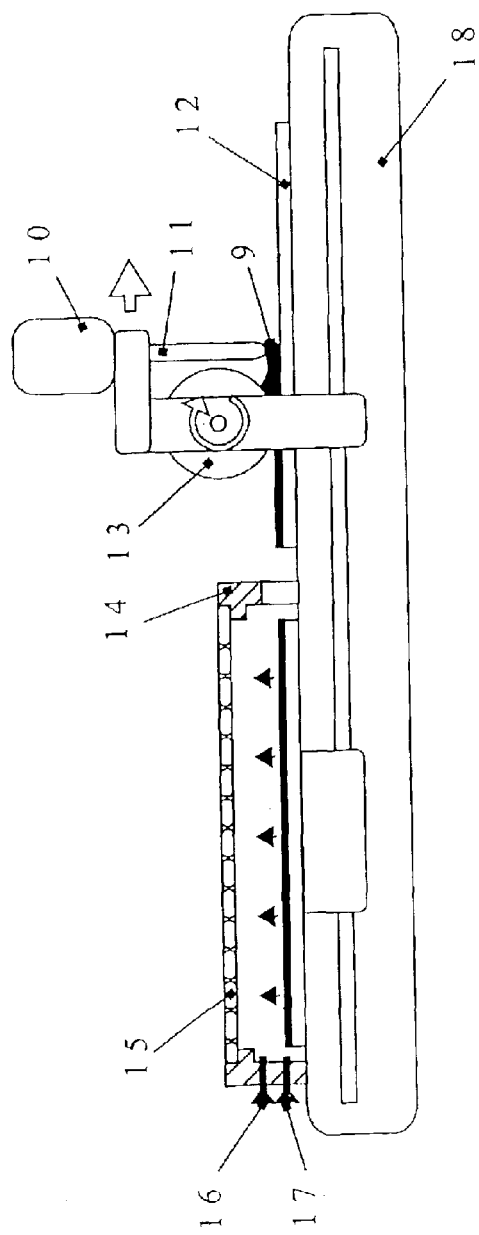
FIG. 3 is a side elevational view schematically illustrating another device for carrying out the invention including controlled drying.
Figure 4:
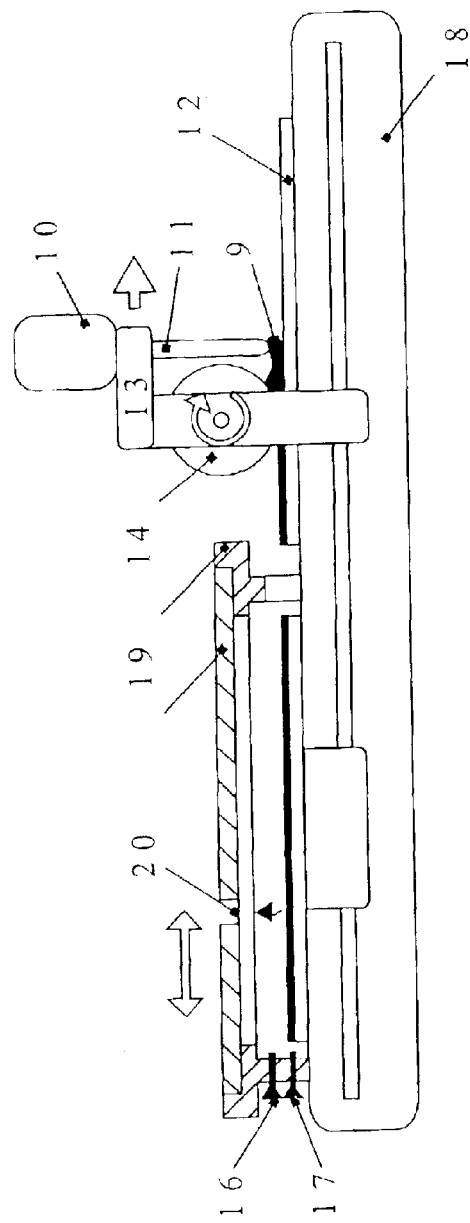
FIG. 4 is a side elevational view of another embodiment of the device shown in FIG. 3.

FIGS. 3 and 4 illustrate devices for drying in accordance with this embodiment of the invention. A liquid crystal solution 9 is fed from the reservoir 10 through the channel 11 onto substrate 12. The channel 11 has a traverse dimension so as to cover the entire width of film formation. The rate of feed of the solution from the reservoir 10 and the relative speed of translation of the reservoir and the feeding channel relative to the substrate 12 is determined by the desired thickness of the layer or film. Alignment of the supramolecular complexes in the layer of LC is preformed with Mayer rod 13 (metallic rod wound with a wire) by application of shear stress. The substrate with the deposited anisotropic film is then subjected to the drying operation (removal of the solvent from the layer of LC). Drying is performed in enclosure 14 in which the required conditions of temperature and humidity above the surface of the film are established. FIG. 3 shows the enclosure 14 covered by a semi-permeable membrane 15, which provides certain retardation of the drying process. In this example, with the pore diameter of about 15 nm and constant temperature of 18° C. inside the enclosure, the humidity above the surface of the film was about 90%. To control conditions of the ambient medium during the process, the enclosure is equipped with humidity sensors 16 and temperature sensor 17. All the mentioned elements: enclosure 14, substrate 12, rod 13, and reservoir 10 and channel 11 have means for relative translation (not shown). All operations according to the disclosed invention may be combined in a single in-line process. In this case, all the elements mentioned above are mounted on a single frame 18. Operation of the system to form the film is as described with respect to FIGS. 1 and 2.

Another method of implementing forced slowing of the drying process is to make the enclosure with a lid 19 featuring a movable slit 20, FIG. 4. Dimensions of the slit and its speed of translation should correspond to the condition of creating the required parameters of temperature and humidity above the surface of the film.

For different examples, we have obtained results, which show the influence of conditions of drying on the structure and properties of forming films. However in all examples, the index of degree of anisotropy of films, perfection of the structure of films, reproducibility of parameters of films over the area and throughout their thickness, as well as thermo-stability of films is significantly higher than analogous indexes obtained with regular drying conditions in air at room temperature (for comparison we used films obtained with identical conditions of deposition and alignment).

The following is an example of forming an anisotropic film from LLC of indanthrone. An eight percent weight aqueous LC solution of sulfonated indanthrone was deposited onto glass substrate via the known method (with external aligning influence on the colloidal system). In this solution, molecules are packed into stacks comprising supramolecular complexes, which are the anisometric particles of the system. When the LC solution is being aligned, these complexes are oriented along the direction of the aligning influence. Thickness of the film before drying was 5–10 µm. The sample was dried in various conditions: a) in air, in infinite volume at room temperature, b) in air, in infinite volume at temperature 10–15° C., c) in air, in a finite volume at temperature 20° C. The enclosure was 15 mm away from the surface of the forming film with a porous membrane 15 with pore diameter 10–20 nm sitiated above the film for slowed removal of solvent vapors from the volume of the enclosure and to create humidity gradient along the normal to the surface of the film. In another experiment, in a finite volume at temperature 20° C. created by the enclosure with lid 19 with its edge translating at the rate of 0.1–1 cm/min over the surface of the forming film, and therefore creating tangential humidity gradient, wherein the direction of translation is such that propagation of the crystallization front is parallel to the direction of the aligning influence during formation. An analogous experiment was carried out with the direction of translation of the edge of the enclosure perpendicular to the direction of the aligning influence during formation.

Comparative analysis of the obtained films showed that implementing the disclosed method enhances optical characteristics of films by 15–30% compared to films obtained with "traditional" methods. Besides that, these methods "heal" the technological macro-defects: streaks and traces of the depositing and aligning tools (rod). As evident from x-ray investigations the films themselves also have more perfect crystalline structures. Increased thermal stability by about 10% is also characteristic of films that have been dried in the finite volume.

Additional results are obtained when using micro-porous membrane in the capacity of the substrate, additional translation of the thermal zone over the surface of the substrate, as well as implementation of automated operation of processes of formation of the film and control over the drying process itself and directly the process of formation of the film.

Usually, one uses porous membrane 15 with pore diameter from 4 nm to 2 mm and porosity no less than 5%. Porosity is selected such as to provide a diffusion barrier to control the flow of gas (solvent). If it is necessary to perform accelerated drying while providing good results, one may use membrane with pore diameter on the order of 0.1 mm.

If one uses micro porous membrane for the substrate on which the colloidal system is deposited as a layer, removal of the solvent will take place through both surfaces of the forming film. Furthermore, parameters of the external membrane and the membrane of the substrate may be selected such that they will create the most identical conditions of removing the solvent, which would yield an even more perfect structure in the film. Usually, the size of pores in the internal and the external membranes are selected equal, or the pore size in the external membrane is chosen somewhat larger than in the internal one. Porosity of membranes is chosen different by depending on the necessary rate of solvent fumes removal. Optimally, porosity and membrane thickness are chosen such as to provide slowing of the drying process no less than by 1.5 times compared to the rate of drying in analogous conditions, but without slowing of the solvent fume deflection rate.

Drying of the forming film may be performed at a temperature less than the temperature of deposition and/or orientation of the colloidal system, or at a temperature equal to the temperature of deposition and/or orientation of the colloidal system, or at a temperature higher than the temperature of deposition and/or orientation of the colloidal system. Drying of the forming film may be performed at humidity higher, equal or less than the one during deposition and/or orientation of the colloidal system.

In the disclosed method, the drying operation may also be performed in at least two stages, first of which is performed at temperature lower than the temperature of deposition and/or orientation of the colloidal system and humidity higher than the one during deposition and/or orientation of the colloidal system, but the last stage is performed at temperature and humidity which are equal to the ones that were used during deposition and/or orientation of the colloidal system.

Drying may be performed in air medium or in the medium of an inert gas, or in chemically active medium, which provides modification of properties of the forming film. To create the necessary medium, the substrate holder with the forming film on it together with the device restricting the rate of deflecting solvent fumes (shell with a slot or a membrane), are placed in an additional casing or reactor.

Usually, drying is carried on until the solvent content in the forming film is from 5% to 15 %. Additionally, after completing the drying process, the formed film may be aged at temperature from 60° to 150° and normal humidity. After that, a protective layer may be formed on it.

Drying may also be performed in the presence of temperature gradient provided by at least a single directed translation of the temperature zone over the surface of the forming film. Here, the direction of translation of the temperature zone is chosen at an angle from 0° to 180° to the direction of external orienting influence. Temperature zone may be moved over the film's surface two or more times. Then, direction of each subsequent translation is chosen to be at an angle from 0° to 90° to the previous one.

In the process of drying and/or after completion of the drying process, one may perform a single aging, of the forming or already formed film, at humidity level higher than that during the drying process. After that, one performs additional drying of the forming film. Such cyclic repetition of operations allows smoothing out stress effects on the crystal structure of the forming film introduced during fabrication.

We have found that additional thermal processing of the film obtained according to the invention leads to not only ablation of any unwanted admixtures, but also to enhanced characteristics of the film and enhanced degree of anisotropy. Additionally, we observed an increase in degree of crystallinity in the film, and enlargement of the supramolecular complexes themselves, which form the structure of the film. We have also found an increase in the thermal stability of the film. These results are achieved by thermal processing of the film or layer by a directional translation of a temperature zone along the substrate surface.

Figure 5:
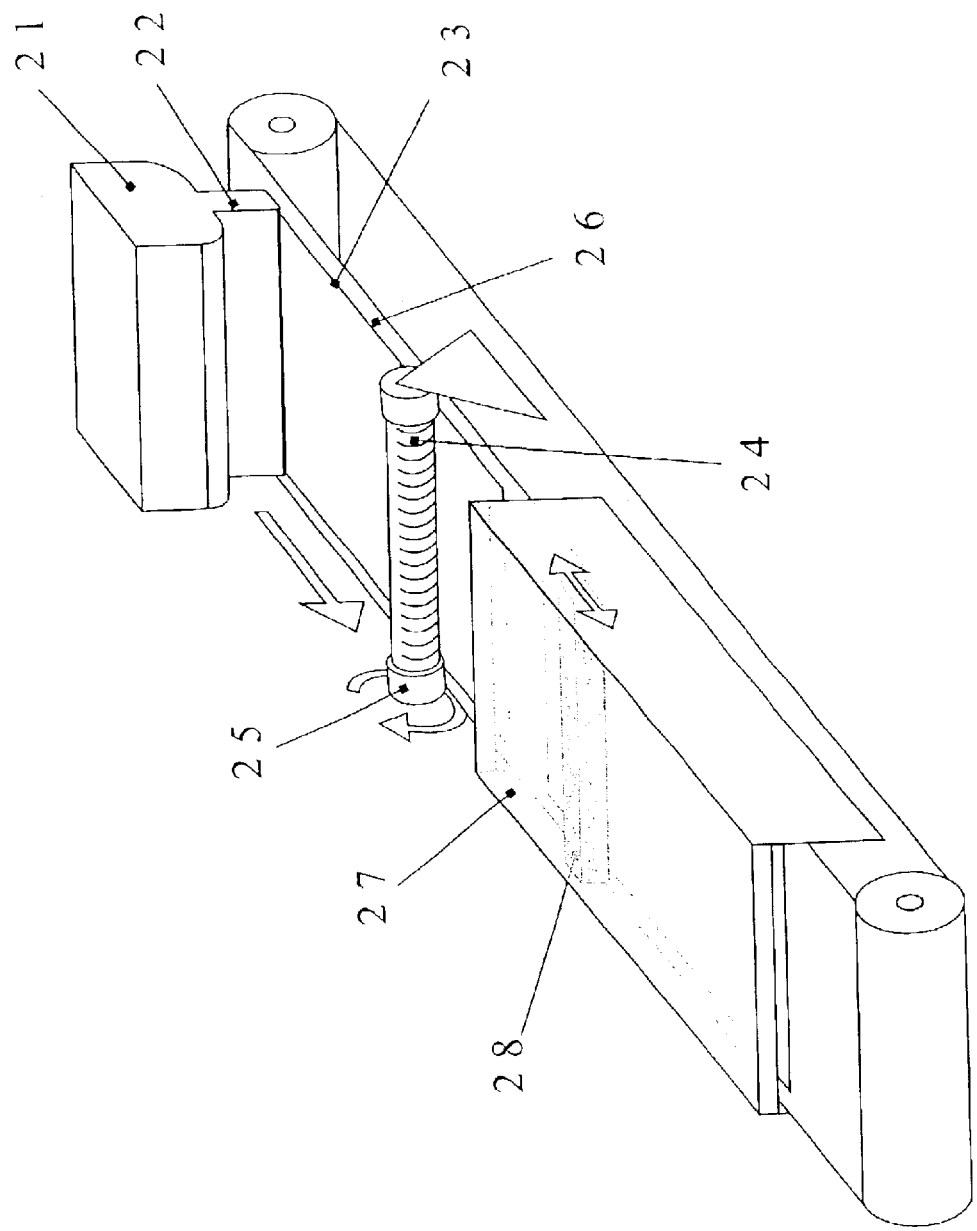
FIG. 5 is a perspective view schematically illustrating a device for carrying out the invention including zone processing.

An example of a device for carrying out the zone heating is illustrated in FIG. 5. As an example, let us consider obtaining anisotropic polarizing film from aqueous liquid crystal solution of sulfonated indanthrone. To obtain the liquid crystal we used 3.0 g. of sulfonated dye, free from inorganic salts, which is dissolved while heated in 37 ml of solvent ($H_2O$). Then, solution is cooled to room temperature. Presence of liquid crystal phase is registered when the sample is observed under polarizing microscope equipped with two crossed polarizers.

The liquid solution is fed under pressure from the reservoir 21 through the channel 22 onto the glass substrate 23. The LC solution is deposited onto the glass substrate with dimension 100×100 $mm^2$ at room temperature and humidity 70%, so as to obtain a film of LC with dimensions 80×80 $mm^2$. The rod 24 in the form of rotating cylinder with diameter—20 mm and length—200 mm is placed above the flat surface of the substrate without possibility to move along it, but with possibility to rotate around its own axis. On the edges of the cylinder there are spacers 25, which are 10 µm thick and 5 mm wide. It is these spacers that determine the thickness of the film. Stage 26 with the substrate 23 is translated at 20 mm/sec relative to the stationary rotating cylinder so that the cylinder in effect is rolling on the surface of the substrate. In this process, liquid crystal of the dye is uniformly distributed over the surface of the substrate and the supramolecular complexes are aligned in the layer of LC. Until the moment of complete drying of the film, it is placed in the enclosure 27, which is built so that it hinders the evaporation of the solvent from the layer of LC, as described above.

A heating element 28, which creates a zone of elevated temperature in the layer of LC (about 450° C.), is translated above the surface of LC layer. The direction of translation of the thermal zone can be chosen to coincide with the direction of, or be perpendicular to, the external influence. Thermal influence is performed in conditions of elevated humidity (95%) in order to prevent complete drying of the film.

The speed of translation of the thermal zone is set to obtain uniform heating throughout the thickness of the film as it is formed. The speed of translation of the thermal zone is from 0.5 to 10 mm/sec. To create a sharper border of the thermal zone one may use additionally mountable screens.

As the result, we obtain anisotropic films, having the following characteristics: $T_0=45\%$, $D_\perp/D_\parallel=22$ compared to $D_{195}/D_{81}=16.5$ for films obtained with traditional methods without additional thermal processing.

To implement the disclosed invention one may use also other methods. For example: on the stage of the external aligning influence one may use a heated Mayer rod, or translate a heated wire under the substrate.

During implementation of the disclosed method, it is preferred to control all technological parameters of the process. Furthermore, manipulation of operations may be automated. One may use liquid crystal solution of an organic dye, where solution concentration determines the presence of anisometric particles—supramolecular complexes in solution. In an LLC, one may use at least one organic dye containing in its structural formula at least one ionogenic group providing its solubility in polar solvents in order to form lyotropic liquid crystal phase, and/or at least one anti-ion, both of which in the process of forming optically anisotropic film either remain in the structure of a molecule or not.

In order to obtain anisotropic films one may use various organic materials, which form colloidal system with anisometric particles. Molecules of the listed below materials have flat shape and when dissolved in a suitable solvent (usually just one) they form supramolecular complexes, which are the anisometric particles of the colloidal system. Based on LLC of the mentioned materials (which will be the very colloidal systems) one may obtain films with optical anisotropy. The following are examples of such organic materials:

Dyestuffs (Translator: in the original text Color Indices and some other additional information are absent; all these data are added to make the information more accurate):

polyrmethine dyestuffs, for example, "pseudoisocyanine", "pinacyanol"; triarylmethane dyes, for example "osnovnoi biriuzovii" (C.I. Basic Dye, 42035 (Turquoise Blue BB (By))), "kislotnii yarko-goluboi 3" (C.I. Acid Blue 1, 4204);

diaminoxanthene dyes, for example, "sulforhodamine S" (C.I. Acid Red 52, 45100 (Sulforhodamine B));

acridine dyes, for example, "osnovnoi zholtii K" (C.I. Basic Dye, 46025 (Acridine Yellow G and T(L)));

sulfonation products of acridine dyes, for example, of "trans-quinacridone" (C.I. Pigment Violet 19, 46500 (trans-Quinacridone));

water-soluble derivatives of anthraquinone dyes, for example, "aktivnii yarko-goluboi KH" (C.I. Reactiv Blue 4, 61205);

sulfonation products of vat dyes, for example, of "flavantrone" (C.I. Vat Yellow 1, 70600 (Flavanthrone), of "indantrenovii zholtii" (C.I. Vat Yellow 28, 69000), of "kubovii zholtii 4K" (C.I. Vat Orange 11, 70805), of "kubovii tyomno-zelenii Zh" (C.I. Vat Green 3, 69500), of "kubovii fioletovii S" (C.I. Vat Violet 13, 68700), of indanthrone (C.I. Vat Blue 4, 69800 (Indanthrone)), of perylene violet dye (CAS: 55034-81-6), of "kubovii alyi 2Z" (C.I. Vat Red 14, 71110);

azo-dyes, for example, Benzopurpurine 4B (C.I. Direct Red 2, 23500), "Pryamoy zheltii svetoprochniy O", "Pryamoy zheltii svetoprochniy" (C.I. Direct Yellow 28, 19555);

water soluble diazine dyes, for example, "Kislotnii temno-goluboi Z" (C.I. Acid Blue 102, 50320);

sulfonation products of dioxazine dyes, for example, of "pigment fioletovii dioxazinovii" (C.I. Pigment Violet 23, 51319);

water-soluble thiazine dyes, for example, C.I. Basic Blue 9, 52015 (Methylene Blue);

water-soluble derivatives of phtalocyanine dyes, for example, cupric octacarboxyphtalocyanine salts;

fluorescent bleaches, as well as other organic materials, for example, disodiumchromeglycate etc., and inorganic materials capable of forming colloidal system with anisometric particles.

In the capacity of the colloidal system one may also use systems created from inorganic lyotropic liquid crystals, such as iron oxohydroxide or vanadium oxide and others.

There has been described a method of obtaining thin anisotropic crystalline films includes application of colloidal system with anisometric particles, or macromolecules, or supra-molecular complexes, which are formed by the grouped and oriented in some way molecules existing in pre-crystalline state onto the substrate. It is preferred that the degree of anisotropy (the ratio of the length to the thickness) of kinetic units of the colloidal system are no less than 10. Colloidal system should also exhibit thixotropy. For this purpose, colloidal system should exist at a certain temperature and have certain concentration of the dispersion phase. The colloidal system (or paste) is brought into the state of heightened fluidity via any type of external action, which loweres viscosity of the system. This could be heating, deformation, etc. External action can continue during the entire next process of orientation or take the time necessary in order that the system does not relax into the state with heightened viscosity during the orientation time.

The next operation of the method is the external orienting action on the system, which could be implemented as by mechanical as well as any other method. The degree of mentioned action should be sufficient so that kinetic units of the colloidal system obtain the desired orientation and form the structure, which will be the foundation of the future crystal lattice in the obtained film. Operations of rendering the colloidal system into fluid state and external orienting action on it can be joined in time and performed sequentially on various regions of the film.

The next operation of the declared method is rendering of the oriented area of the obtained film from the state with lowered viscosity, which was achieved by the first external action, into the state with the initial or higher viscosity. This is implemented so as to avoid disorientation of the structure and creating defects on the surface of the film. This operation is necessary and cannot be implemented as just a process of free or forced drying, i.e. removing the solvent from the formed film. Before the drying process, viscosity of the system should be raised either by removing the earlier applied action, which provided lowering of the viscosity before the orienting process, or by an additional forced action on the system to "freeze" its structure. Only thixotropic colloidal systems, when exerted with the above actions can ensure obtaining the desired results at each of the above-listed intermediate stages of forming anisotropic crystalline films.

The final operation of the declared method is the drying operation (solvent removal), in the process of which the crystalline structure in the obtained film is formed. Regimes of drying operation should be chosen so as to eliminate the possibility of disorientation of the earlier obtained structure and provide relaxation of stresses ("smoothing" of the crystalline lattice defects) appearing during external orienting action. It is preferred to perform drying process at raised humidity (no less than 50% at room temperature). The critical factor for obtaining high degree of crystallinity in the obtained film will be the speed and directionality of the solvent removal out of the system.

What is claimed is:

1. A method of fabricating anisotropic crystalline films comprising the steps of:

applying a layer of a colloidal system with anisometric particles onto a substrate, externally impacting the colloidal system to lower the viscosity of the applied layer of the colloidal system, applying external orienting action on the colloidal system to provide dominant orientation of particles of the colloidal system, allowing the deposited colloidal system with dominant orientation of the particles to return to at least its initial value of viscosity, and drying the deposited layer.

2. The method according to claim 1 wherein the external impact on the colloidal system and the external orienting action on the system are carried out simultaneously.

3. The method according to claim 1 wherein the external impact on the colloidal system further comprises heating the colloidal system to lower its viscosity prior to applying the external orienting action.

4. The method according to claim 2 wherein the external impact on the system is performed via mechanical action on the layer of colloidal system as it is applied onto the substrate.

5. The method according to claim 1 wherein during the drying of the deposited layer, humidity gradients are created in tangential or normal direction above the surface of layer.

6. The method according to claim 5 wherein the finite volume over the surface of the deposited layer is created by performing the drying operation in a shell encasing at least a part of the surface of the layer and humidity gradient above the surface of the deposited layer is created via at least a single shifting of the shell along the surface of layer in at least one direction.

7. The method according to claim 1 wherein the drying of the deposited layer is performed at a temperature in the interval 0° to 50° C. and humidity in the interval from 60 to 90% with a forced slowing of the drying rate by performing the process in a finite volume which is configured to resist deflection of solvent fumes from the surface of the deposited layer.

8. The method according to any of claim 1 or 7, which further comprises a thermally processing the deposited layer via at least a single directional pass of the temperature zone along the layer.

9. The method according to claim 8, wherein the temperature zone is created via a local heating of the substrate on the side opposite to that on which the deposited layer is formed.

10. The method according to claim 8, wherein simultaneously with the local heating in the temperature zone, the rest of the substrate is cooled.

11. The method according to claim 8, wherein the temperature of the temperature zone is chosen to be no less than 10% higher than the substrate temperature and no less than 10° less than the decomposition temperature of the crystalline film.

12. The method according to claim 8, wherein the direction of pass of the temperature zone is chosen to coincide with the direction of the orientation.

13. The method according to claim 8, wherein the multiple passes of the temperature zone are performed with the direction of each subsequent pass chosen at an angle from 0° to 180° to the previous one.

14. The method according to claim 8 wherein for at least a part of the time during fabricating of the anisotropic crystalline film the deposited layer is under constant electric and/or magnetic field.

15. The method according to claim 7 wherein the finite volume is created by a shell, at least part of which is implemented in the form of porous membrane having pore diameter from 4 nm to 2 mm and porosity no less than 5%.

16. The method according to claim 7 wherein the drying step is performed at a temperature lower than the temperature of deposition and orientation of the colloidal system, and humidity higher than the humidity of deposition and orientation of the colloidal system.

17. The method according to claim 7 wherein a microporous membrane is used as the substrate for the application of the colloidal system.

18. The method according to claim 7 wherein the drying is performed until a solvent content in the film is 2 to 15%.

19. The method according to claim 7 wherein, after completion of the drying, the crystalline film is aged at temperature from 60° to 150° and normal humidity.

20. A method of fabricating anisotropic crystalline films comprising the steps of:

external impacting a colloidal system with anisometric particles situated in a reservoir to lower the viscosity, external orienting action on the colloidal system to provide a dominant orientation of particles of the colloidal system via running it through a slot-die under pressure, formation of a film with raised viscosity upon exiting from the the slot-die due to cession of the external impact or application of an additional external impact to provide restoration of at least the initial value of viscosity of the colloid system, application of the said formed film onto a substrate, and drying the deposited layer.

21. The method according to claim 20 wherein the external impact on the colloidal system is performed via heating the colloid system placed in the reservoir.

22. The method according to claim 20 wherein the external orienting action is performed using the slot-die, inner walls of which feature the orienting relief.

23. The method according to claim 20 wherein a lyotropic liquid crystal is used in the capacity of the colloid system.

24. The method according to claim 20 wherein the external action is chosen such as to ensure phase transition in the colloid system.

25. The methods according to claim 20 wherein sol or gel is used in the capacity of the colloid system.

26. The method according to claim 20 wherein the anisometric particles in the colloid system are crystalline.

27. The method according to claim 20 wherein one uses the colloid system, concentration of dispersion phase in which is chosen such as to provide thixotropy of the system.

28. The method according to claim 20 wherein the anisometric particles in the system carry charge.

29. A device for fabricating a crystalline film on a substrate comprising:
   a substrate holder,
   means mounted on a selected distance above the substrate for applying a layer of a colloidal system with anisotropic particles of predetermined thickness onto the substrate carried by the substrate holder,
   an orienting tool for applying an orienting action on the colloidal system applied to the substrate, and
   means for heating the colloidal system applied to the substrate.

30. The device according to claim 29 wherein the means for heating the colloidal system heats at least part of the substrate holder.

31. A device for fabricating a crystalline film on a substrate comprising:
   a reservoir for placing a colloid system, supplied with heating elements and means of creating extra pressure in a reservoir,
   a substrate holder, installed at a controlled distance under the reservoir with possibility of movement relative to the reservoir in the horizontal plane;
   wherein the lower part of the reservoir has an opening in the shape of a slot-die, dictating conditions of an orienting impact.

32. The device according to claim 31 wherein under the substrate holder there is a thermo-element implemented such that it allows maintaining certain temperature over at least a part of the substrate holder surface.

33. The device according to claim 31 wherein at least a part of the slot-die surface features a relief.

34. The device according to claim 31 wherein at least a part of the slot-die surface features hydrophilic or hydrophobic coating.

* * * * *